(12) United States Patent
Karalis

(10) Patent No.: US 8,561,711 B2
(45) Date of Patent: Oct. 22, 2013

(54) DISPENSING VALVE AND METHOD FOR DISPENSING A FLUID UNDER PRESSURE

(75) Inventor: Peter Karalis, Watertown, MA (US)

(73) Assignee: Kidde-Fenwal, Inc., Ashland, MA (US)

( * ) Notice: Subject to any disclaimer, the term of this patent is extended or adjusted under 35 U.S.C. 154(b) by 249 days.

(21) Appl. No.: 13/119,095

(22) PCT Filed: Sep. 19, 2008

(86) PCT No.: PCT/US2008/076922
§ 371 (c)(1),
(2), (4) Date: Mar. 15, 2011

(87) PCT Pub. No.: WO2010/033119
PCT Pub. Date: Mar. 25, 2010

(65) Prior Publication Data
US 2011/0168415 A1    Jul. 14, 2011

(51) Int. Cl.
*A62C 2/00* (2006.01)
(52) U.S. Cl.
USPC .............................................. 169/46; 239/569
(58) Field of Classification Search
USPC .......... 169/9, 19, 20, 89, 16, 17, 46; 239/569, 239/570, 124
See application file for complete search history.

(56) References Cited

U.S. PATENT DOCUMENTS

| | | |
|---|---|---|
| 2,365,364 A | 12/1944 | Temple |
| 2,515,068 A | 7/1950 | Young |
| 2,661,804 A | 12/1953 | Haessler |
| 2,972,998 A | 2/1961 | Detwiler |
| 3,052,304 A | 9/1962 | Williamson et al. |
| 3,087,643 A | 4/1963 | Smirra |
| 3,101,733 A | 8/1963 | Lord |
| 3,580,274 A | 5/1971 | Hansen |
| 3,742,968 A | 7/1973 | Kennedy |
| 3,913,604 A | 10/1975 | Hanson et al. |
| 4,292,992 A | 10/1981 | Bhide |
| 4,421,005 A | 12/1983 | Byrne |
| 4,505,336 A | 3/1985 | Thevis et al. |
| 4,561,630 A | 12/1985 | McCulloch |
| 4,615,356 A | 10/1986 | Reip |

(Continued)

FOREIGN PATENT DOCUMENTS

| | | |
|---|---|---|
| DE | 19730934 | 1/1999 |
| WO | 9302894 | 2/1993 |
| WO | 03084785 A1 | 10/2003 |
| WO | 2007073390 A1 | 6/2007 |

OTHER PUBLICATIONS

International Search Report and Written Opinion mailed Nov. 14, 2008.

(Continued)

*Primary Examiner* — Davis Hwu
(74) *Attorney, Agent, or Firm* — Cantor Colburn LLP

(57) ABSTRACT

A dispensing valve apparatus and method for rapidly dispensing fluid from a fluid reservoir of a pressure vessel include a piston translatable within a cavity that closes a discharge passage opening the cavity when positioned in a first position and opens the discharge passage to fluid flow from the fluid reservoir when positioned in a second position. The piston may be rapidly repositioned from its position to its second position by venting a cavity disposed between the piston and an actuator cap by selectively opening a check valve to vent the pressure within the cavity to the discharge passage.

5 Claims, 3 Drawing Sheets

(56) References Cited

U.S. PATENT DOCUMENTS

| | | |
|---|---|---|
| 4,682,531 A | 7/1987 | Mayer |
| 5,295,429 A | 3/1994 | Monk |
| 5,305,914 A | 4/1994 | Hoo et al. |
| 6,029,947 A | 2/2000 | Sears |
| 6,032,745 A | 3/2000 | Sears |
| 7,281,672 B2 | 10/2007 | Karalis et al. |
| 7,341,238 B2 | 3/2008 | Karalis et al. |
| 2005/0205129 A1 | 9/2005 | Karalis et al. |
| 2006/0032641 A1* | 2/2006 | Akins et al. ............ 169/19 |
| 2006/0102749 A1* | 5/2006 | Crabtree et al. ........ 239/410 |
| 2007/0060825 A1 | 3/2007 | Newman et al. |

OTHER PUBLICATIONS

International Preliminary Report on Patentability mailed Oct. 18, 2010.

* cited by examiner

DISPENSING VALVE AND METHOD FOR DISPENSING A FLUID UNDER PRESSURE

FIELD OF THE INVENTION

This invention relates generally to the dispensing of fluid from a pressurized reservoir. More particularly, the invention relates to a dispensing valve assembly and a method for dispensing a fire suppression agent from a pressure vessel wherein the fire suppression agent is stored under pressure.

BACKGROUND OF THE INVENTION

Fire suppression systems are commonly used in connection with off-road vehicles, marine vessels, gas stations and commercial buildings, such as for example restaurants, and in like applications where a fire is likely to rapidly expand if not quickly suppressed. Commonly, conventional fire suppression systems suitable for use in such applications operate by dispensing a fire suppression agent in a flow of pressurized gas through a network of distribution pipes or hoses to a plurality of spray nozzles. The pressurized gas may be a chemically non-reactive gas such nitrogen, carbon dioxide, argon, neon, helium or other chemically non-reactive gas, or mixtures of any two or more of these gases. The fire suppression agent may be a wet chemical fire suppression agent, a dry chemical fire suppression agent or a gaseous fire suppression agent.

In conventional fire suppression systems of this type, the fire suppressant, that is the fire suppression agent and gas mixture, is stored under pressure in one or more pressure vessels. Typically, the fire suppressant is stored at a pressure of at least 200 pounds per square inch and in some systems at pressures in excess of 1000 pounds per square inch. A valve is provided in communication with the outlet from the pressure vessel for dispensing the fire suppressant from the gas reservoir within the pressure vessel into the distribution network. This valve must prevent leakage of the high pressure gas from the pressure vessel for long periods of time, but rapidly respond to dispense the high pressure fire suppressant to the distribution network in the event the valve is activated in response to a fire detection signal.

One type of valve often used in conventional fire suppression systems of the type described above is commonly referred to as a balance pressure valve. Conventional balance pressure valves include an axially translatable piston disposed within an axially extending central cavity within the valve body. One end face of the piston is exposed to the gas pressure within the pressure vessel; while the opposite end face of the piston is exposed to the gas pressure within an upper chamber of the valve. A spring biased check valve, operatively associated with an actuator cap disposed at distal end of the central cavity, prevents leakage of the gas from the upper chamber when the check valve is sealed against the actuator cap. In a first position, the piston is located within the central cavity so as to block off the opening to a discharge passage extending radially through the valve body.

When the valve is activated in response to a fire detection signal, the piston is translated axially to a second position whereat the piston is repositioned into the upper chamber of the valve body and the piston no longer blocks the opening to the radially directed discharge passage. In this second position, the high pressure fire suppressant rapidly flows from the reservoir of the pressure vessel into a central cavity of the valve body and out through the discharge passage into the distribution network. The valve is activated by forcibly translating the aforementioned check valve away from the end face of the actuator cap thereby opening a flow passage through which the gas pressure within the upper chamber rapidly vents to atmospheric pressure through a vent port opening to the environment external of the valve, thereby creating a pressure imbalance across the piston, resulting in the piston rapidly translating into the upper chamber under the pressure of the fire suppressant discharging from the pressure vessel.

When used in applications where the fire suppression system is exposed to outdoor conditions or in harsh environments, it is possible for the vent port to become covered over or clogged with ice, particulate, ash or other debris. The build-up of ice or debris over the vent port could adversely impact the reliability of the system. Therefore, it is necessary to periodically check the condition of the vent port and remove any ice or debris that may be blocking the vent port.

SUMMARY OF THE INVENTION

In an aspect of the invention, a dispensing valve apparatus is provided for rapidly dispensing a fire suppressant fluid from a pressure vessel having a fluid reservoir containing the fire suppressant fluid under pressure. The dispensing valve apparatus includes a valve body having a forward end adapted to mount to the pressure vessel The valve body has a bore extending axially therethrough that defines an axially extending central cavity having a forward cavity for receiving fluid from the fluid reservoir of the pressure vessel and a rearward cavity. The valve body also has a generally radially extending discharge passage opening to the forward cavity. A piston is disposed within the cavity. The piston is axially translatable within the forward cavity and the rearward cavity from a first position wherein the discharge passage is closed to fluid flow and a second position wherein the discharge passage is open to fluid flow. An actuator cap is secured to the valve body at a rearward end of the rearward cavity. The actuator cap has a central bore establishing a fluid flow passage in communication with the rearward cavity and extending through the actuator cap. A check valve is disposed within the central bore through the actuator cap. The check valve is positionable between a first position wherein the central bore through the actuator cap is closed to fluid flow and a second position wherein the central bore through the actuator cap is open to fluid flow. Further, the valve body has a vent passage extending through the valve body. The vent passage being in fluid flow communication with the discharge passage and, when check valve is positioned in its second position, also in fluid flow communication with the rearward cavity.

The dispensing valve may also include a valve cap secured to a rearward end of the valve body and an actuator disposed within a cavity defined by the valve cap. The actuator is selectively axially translatable toward the actuator cap for repositioning the actuator cap check valve from its first position to its second position to vent fluid into the vent passage.

In an aspect of the invention, a method is provided for dispensing a fire suppressant fluid from a pressure vessel having a fluid reservoir containing the fire suppressant fluid at a first pressure. The method includes the steps of: providing a valve body having a cavity having an inlet chamber in fluid communication with the fluid reservoir of the pressure vessel and having a discharge passage in fluid communication with a fire suppressant distribution network; disposing a piston within the cavity between the inlet chamber of the cavity and a second chamber of the cavity; holding the piston in a first position wherein the discharge passage is closed to fluid flow from the inlet chamber by maintaining the second section of the cavity at a pressure substantially equal to the first pressure within the fluid reservoir; and repositioning the piston into a second position wherein the discharge passage is open to fluid flow from the inlet chamber by selectively venting fluid within the second chamber to the discharge passage

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Figure 1:
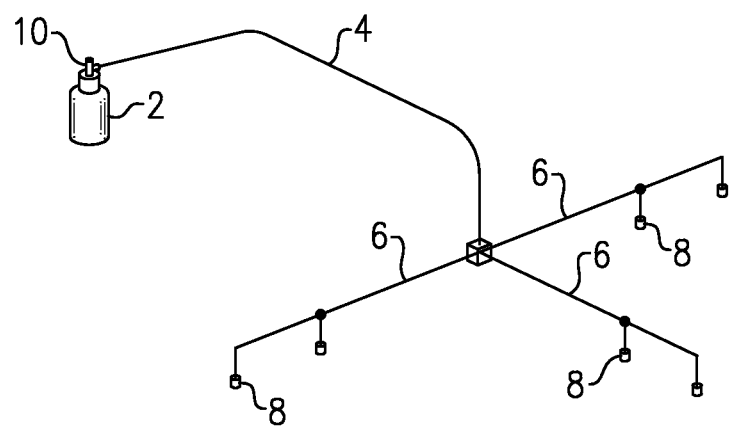
FIG. 1 is a schematic diagram in perspective illustrating a fire suppression system.

Referring initially to FIG. 1, there is depicted an exemplary embodiment of a fire suppression system including a pressure vessel 2 defining a fluid reservoir in the interior thereof and equipped with a dispensing valve apparatus 10 mounted to the outlet of the pressure vessel 2 in fluid flow communication with the fluid reservoir. The dispensing valve apparatus 10 has a discharge outlet in fluid flow communication with a main distribution line 4 of a fire suppressant distribution network that also includes several branch lines 6 supplied by the main distribution line 4. A spray nozzle 8 may be mounted to the terminal end of each of the branch lines 6 for dispersing the fire suppressant over a wide area. When the dispensing valve apparatus 10 is in its closed position, the fire suppressant remains stored under pressure, typically at pressure of at least 200 pounds per square inch to several hundred pounds per square inch. When the dispensing valve apparatus 10 is opened in response to a fire detection signal, the fire suppressant flows from the pressure vessel 2 through the main distribution line 4 and the branch lines 6 to be dispersed into the protected space through the spray nozzles 8.

Figure 4:
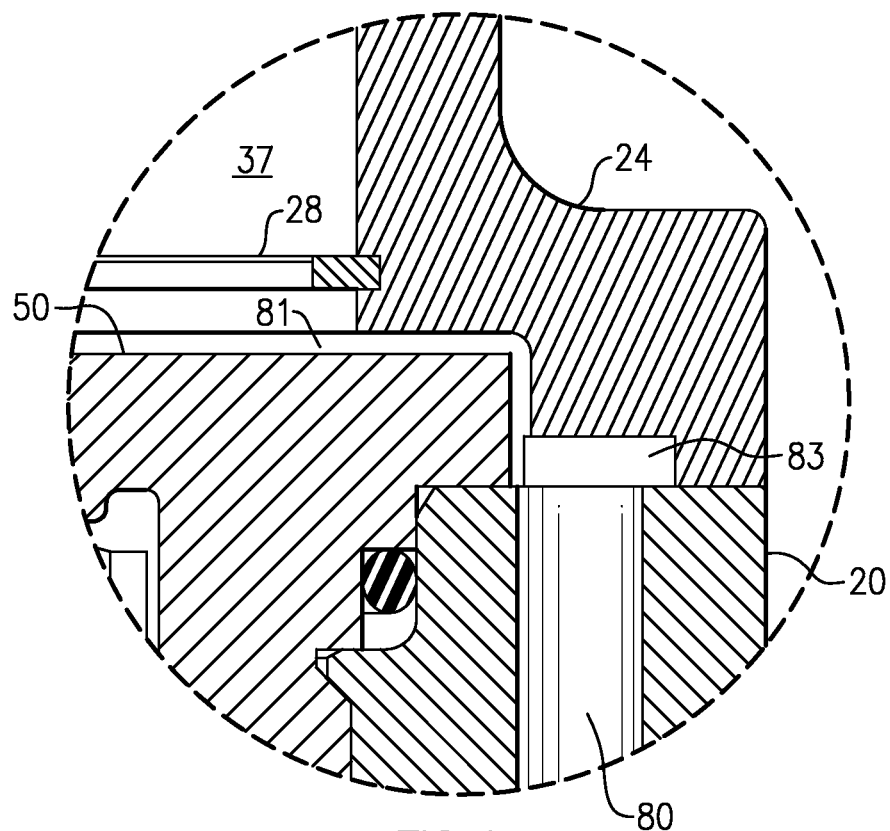
FIG. 4 is an exploded sectioned elevation view of the section of FIG. 3 encompassed by line 4.
Figure 2:
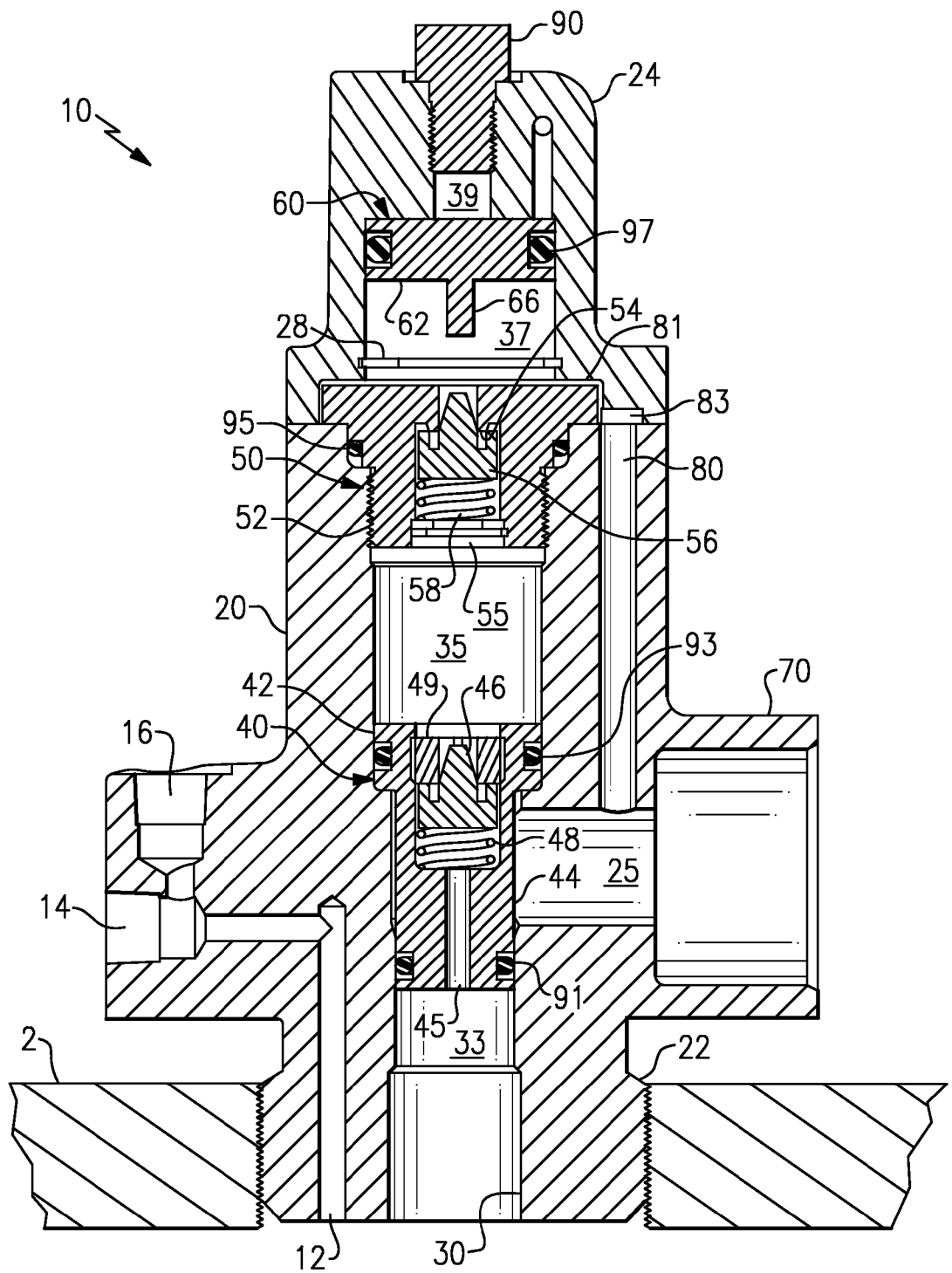
FIG. 2 is a sectioned elevation view of an exemplary embodiment of a dispensing valve assembly in accordance with the present invention in its closed position.
Figure 3:
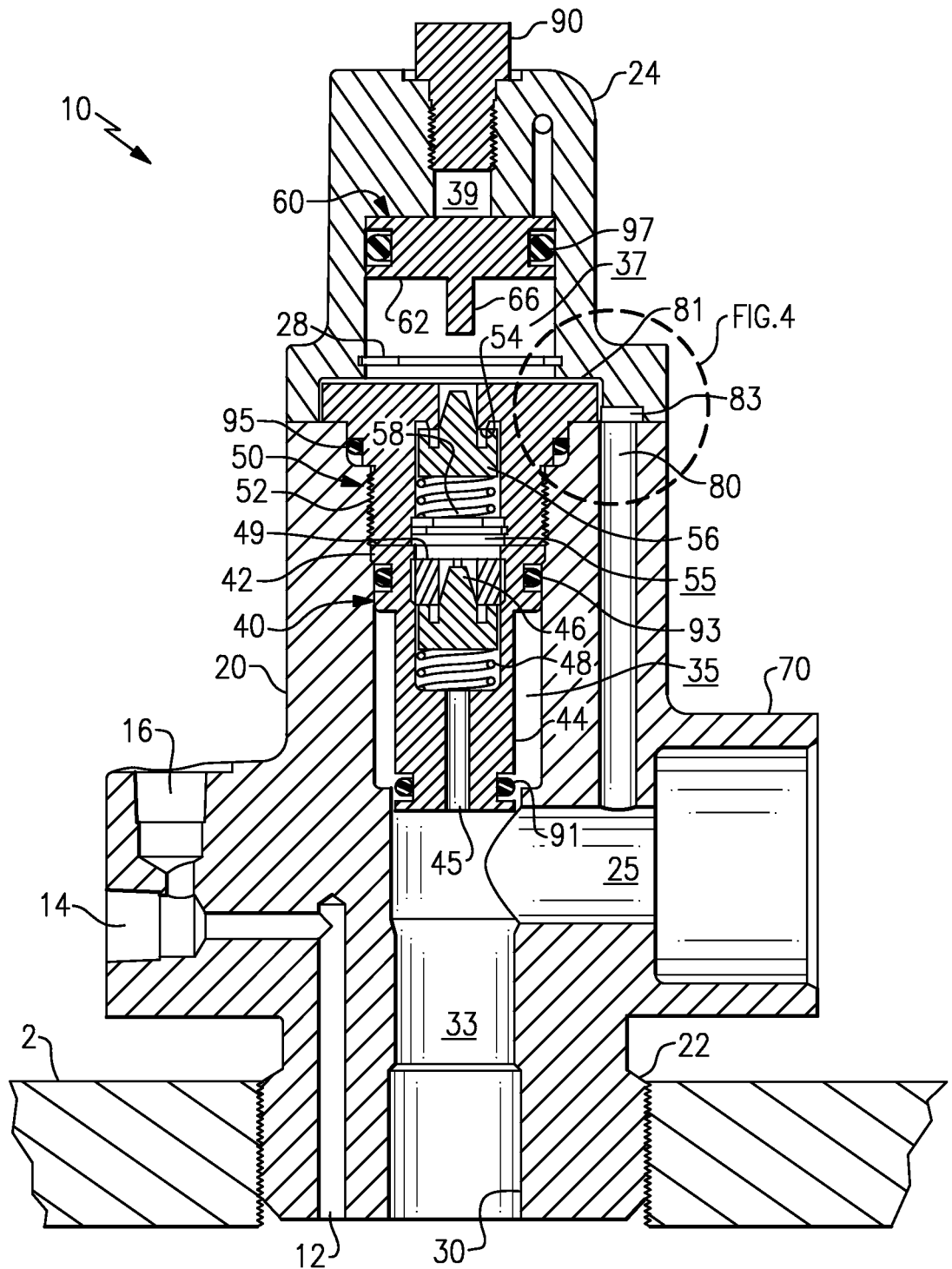
FIG. 3 is a sectioned elevation view of the exemplary embodiment of the dispensing valve assembly of FIG. 2 in its open position.

Referring now to FIGS. 2, 3 and 4, in particular, the dispensing valve apparatus 10 includes a valve body 20 having an axially elongated bore 30 extending along the central axis of the valve body 20 and defining an axially elongated cavity. The valve body 20 also has an outlet arm 70 extending generally radially outward from the valve body and a discharge passage 25 that opens at its inlet end to the axially extending cavity defined by the bore 30 and extends through the outlet arm 70 to open exteriorly of the valve body 20. The outlet arm 70 is adapted to connect in fluid flow communication to the main distribution line 4. The valve body 20 also includes an axially extending vent passage 80 that extends from the rear end face of the valve body 20 through the valve body to open into the discharge passage 25.

The forward or proximal end 22 of the valve body 20 is adapted to be mounted to the outlet of the gas vessel 2. For example, the proximal end 22 of the valve body may be provided with external threads to facilitate mounting to and removal from the outlet of the pressure vessel 2. A valve cap 24 may be mounted to the rear or distal end of the valve body 20, which is the end of the valve body 20 axially opposite the forward or proximal end of the valve body 20. The valve body 20 may also include pressure tap passage 12 opening through the end face of the proximal end of the valve body and extending therefrom to communicate the pressure within the fluid reservoir of the gas vessel 2 to a pair of pressure ports 14 and 16 to which a pressure gage and a pressure switch, respectively, may be connected.

The axially extending cavity defined by the bore 30 extending through the valve body 20 includes a rearward cavity 35 and a forward cavity 33. The portion of the bore 30 commensurate with the rearward cavity 35 has a slightly larger diameter than the diameter of that portion of the bore 30 commensurate with the lower cavity. The discharge passage 25 opens to the forward cavity 33. A piston 40 is disposed within the axially elongated bore 30 for axial translation therein. The piston 40 has a body having a head 42 and a shaft 44 extending forwardly from the head 42 of the piston. The head 42 of the piston 40 has a slightly larger diameter than the diameter of the shaft 44 of the piston 40. The diameter of the head is sized to accommodate axial translation of the piston head 42 within the diameter of the rearward cavity 35. The diameter of the piston shaft 44 is sized to accommodate axial translation of the piston shaft 44 within the diameter of the forward cavity 33. Additionally, O-rings 91 and 93 are provided in circumferential lands formed in the head 40 and the forward end of the shaft 42, respectively, of the piston 40 to seal against the passage of fluid around the piston 40.

A central bore 45 extends axially through the body of the piston 40 from its forward face at the forward end of the piston shaft 44 to its rear face at the rearward end of the piston head 42. The rearward end of the central bore 45 has an enlarged diameter to form a cavity in which a check valve 46 is disposed. The check valve is axially translatable within this cavity between a closed position wherein fluid flow through the bore 45 is precluded and an open position wherein fluid flow through the bore 45 is permitted. In the closed position, the piston check valve 46 is biased rearward by a bias spring 48 against a cavity plug 49 threaded into the central bore 45 at the rearward face of the piston head 42. In the open position, the piston check valve 46 is forced away from the cavity plug 49 to compress the bias spring 48 and permit fluid to pass from the rearward cavity 35 into the forward cavity 33, such as during initial pressure balancing of the rearward and forward cavities.

An actuator cap 50 is secured to the distal end of the valve body 20. The actuator cap 50 comprises a plug that has shaft 52 having an external set of threads compatible with an internal set of threads formed in the bore 30 at the distal end of the valve body 20. When the actuator cap 50 is threaded into the bore 30, the head of the actuator cap abuts the end face of the distal end of the valve body 20. An O-ring 95 is disposed in a circumferential land extending about the head of the actuator cap 50 to seal against the passage of fluid flow around the actuator cap. A central bore 55 extends axially through the actuator cap 50 and defines a cavity housing a check valve 56. The check valve 56 is axially translatable within this cavity between a closed position wherein fluid flow through the bore 55 is precluded and an open position wherein fluid flow through the bore 55 is permitted. In the closed position, the actuator cap check valve 56 is biased rearward by a bias spring 58 against a shoulder 54 formed in the central bore 55. In the open position, the piston check valve 56 is forced away from the shoulder 54 to compress the bias spring 58 and permit fluid to pass out of the rearward cavity 35 through the central bore 55 of the actuator cap 50.

As noted previously, the valve cap 24 is mounted to the rear or distal end of the valve body 20. The forward end face of the valve cap 24 abuts against the rear end face of the valve body 20. The valve cap 24 defines a cavity 37 housing an actuator 60. The forward end face of the valve cap 24 is machined to provide a countersink forward of the cavity 37 such that a gap 81 is established about the head of the actuator cap 50 and between the actuator cap 50 and the valve cap 24 when the valve cap 24 is secured to the distal end of the valve body 20. As will be discussed further, the gap 81 functions as a fluid flow passage. Additionally, a recess 83 may be machined in the forward end face of the valve cap 24 opposite the vent passage 80 in the valve body 20 to facilitate the passage of fluid flow from the gap 81 into the vent passage 80.

The actuator 60 has a body 62 having a centrally disposed push rod 66 extending forwardly from the body 62. An O-ring 97 is disposed in a circumferential land extending about the head of the actuator body 62 to seal against the passage of fluid flow around the actuator 60. The actuator 60 is axially translatable within the cavity 37 defined within the valve cap 24 from a rear position wherein the rear face of the actuator body 62 abuts against a shoulder formed in the valve cap 24 at the rear of the cavity 37 to a forward position wherein the forward face of the actuator body 62 contacts a stop ring 28 supported from the inner wall of the valve body 24 at the forward end of the cavity 37.

The cavity 37 also opens to a central bore 39 that extends through the rearward end of the valve body 24. The bore 39 is adapted to receive a linear actuator 90. For example, the bore 39 may be provided with a set of internal threads compatible with a set of external threads on the shaft on the linear actuator 90, whereby the linear actuator may be secured to the valve body 24 by being threaded into the bore 90. When activated, the linear actuator 90 functions to rapidly drive the actuator 60 forwardly within the cavity 37 to abut against the stop ring 28. As the actuator body 62 moves rapidly forward to this forward position, the push rod 66 contacts the check valve 56 and drives the check valve 56 forwardly against the bias spring 58 and out of contact with the shoulder 54 of the actuator cap 50, thereby opening the bore 55 through the actuator cap 50 to fluid flow from the cavity 35. The linear actuator may, for example, comprise an electromechanical actuator of the conventional type wherein an explosive charge is detonated by an electrical signal to produce a high pressure gas flow, such as the commercially available Metron Protractor device.

In the dispensing valve apparatus 10, the piston 40 translates within the bore 30 of the valve body 20 in response to the differential in pressure forces acting on the respective forward end face of the piston shaft 44 and rearward end face of the piston head 42. The forward cavity 33 of the bore 30 functions as an inlet chamber and is in fluid pressure communication with the fluid reservoir of the pressure vessel 2 when the dispensing valve apparatus 10 is mounted to the outlet of the pressure vessel 2. Thus, the fluid pressure in the forward cavity, which acts upon the end face of the piston shaft 44, is equal to the fluid pressure within the fluid reservoir of the pressure vessel 2. The fluid pressure in the rearward cavity 35 acts upon the rearward end face of the piston head 42. The piston 40 is held in a first position, as seen in FIG. 2, wherein the discharge passage 25 is closed to fluid flow from the inlet chamber, i.e. the forward cavity 33, by also maintaining the rearward cavity 35 at a fluid pressure substantially equal to the fluid pressure within the forward cavity 33, which is equal to the fluid pressure within the fluid reservoir of the pressure vessel 2.

When the dispensing valve apparatus 20 is first mounted to the pressure vessel 2 and the pressure vessel 2 is pressurized with gas in the conventional manner, both of the check valves 46 and 56 open during the pressuring process and close upon termination of the pressuring process, which ensures that the pressure within the cavity 35 is balanced with the pressure in the cavity 33. Additionally, a bleed path may be provided between chambers 33 and 35 around the check valve 46 and around cavity plug 49 threaded into the bore 45 via the threads. In the event of a slow leak of fluid out of the cavity 35, for example past O-ring 95, the fluid pressure within cavity 35 will decrease and fluid from the cavity 33 will flow through the bleed path into cavity 35 to again bring the fluid pressure within the cavity 35 in balance with the fluid pressure in cavity 33 so that the piston 40 will not translate out of its first position and the dispensing valve assembly 10 will remain closed to flow. Similarly, in the event that the fluid pressure within the fluid reservoir of the pressure vessel 2 fluctuates, for example if the ambient temperature in the environment surrounding the pressure vessel changes significantly, fluid will pass between the cavities 33 and 35 as necessary via the bleed path to maintain the fluid pressures in the respective cavities in balance.

When the fire suppression system is to be activated in response to a fire detection signal, the piston 40 is rapidly repositioned into a second position, as seen in FIG. 3, wherein the discharge passage 25 is open to fluid flow from the inlet chamber, i.e. cavity 33, by venting fluid within the rearward cavity 35 to the discharge passage 25. In the dispensing valve apparatus 10 of the invention, this is accomplished by opening the check valve 56 in the actuator cap 50 as hereinbefore described through activation of the actuator 90 in response to the detection of a fire. When the check valve 56 moves to its open position, fluid flows from the cavity 35, through the formerly closed but now open bore 55 extending through the actuator cap 50 into cavity 37, through the flow passage established by the gap 81, through the recess 83 and into the vent passage 80, as best seen in FIG. 4, and therethrough into the discharge passage 25 which is in fluid communication with the main distribution line 4 of the fire suppression system.

As the fluid within the rearward cavity 35 rapidly vents out of the cavity as described, the pressure within the cavity rapidly drops thereby creating a pressure force imbalance across the piston 40. As a result of this pressure force imbalance, the piston 40 quickly translates rearward to the rear of the cavity 35 to its second or fully retracted position. With the piston 40 fully retracted, the piston shaft 44 no longer blocks the opening in the bore 30 to the discharge passage 25 and fluid from within the reservoir of the pressure vessel 2 passes through the lower cavity 33, into the discharge passage 25 and thence into the main distribution line 14 connected to the outlet leg 70 of the dispensing valve apparatus 10.

In the dispensing valve apparatus 10 of the invention, the rearward cavity 35 functions as a balance pressure chamber and the venting of this chamber is accomplished entirely within the valve body 20. Thus, the reliability of the dispensing valve apparatus 10 is substantially improved relative to that of conventional dispensing valves of the pressure balance type wherein the venting of the pressure balance chamber is directly to the environment external of the valve through a vent port opening to the external environment.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment disclosed as, but that the disclosure will include all embodiments falling within the scope of the appended claims.

I claim:

1. A dispensing valve apparatus for dispensing a fire suppressant fluid from a pressure vessel having a fluid reservoir containing the fire suppressant fluid under pressure, said dispensing valve apparatus comprising:

a valve body having a forward end adapted to mount to the pressure vessel, said valve body having a bore extending axially therethrough, said bore defining an axially extending central cavity having a forward cavity for receiving fluid from the fluid reservoir of the pressure vessel and a rearward cavity, said valve body having a generally radially extending discharge passage opening to the forward cavity;

a piston disposed within said cavity, said piston being axially translatable within the forward cavity and the rearward cavity from a first position wherein said discharge passage is closed to fluid flow and a second position wherein said discharge passage is open to fluid flow;

an actuator cap secured to said valve body at a rearward end of the rearward cavity, said actuator cap having a central bore establishing a fluid flow passage in fluid flow communication with the rearward cavity and extending through said actuator cap;

a check valve disposed within said central bore through said actuator cap, said check valve positionable between a first position wherein said central bore through said actuator cap is closed to fluid flow and a second position wherein said central bore through said actuator cap is open to fluid flow; and said valve body having a vent passage extending through said valve body, said vent passage being in fluid flow communication with said discharge passage, said vent passage being in fluid flow communication with said rearward cavity when said check valve is positioned in its second position, said vent passage fluidly connecting said rearward cavity and said discharge passage internally of said valve body.

2. A dispensing valve apparatus for dispensing a fire suppressant fluid from a pressure vessel having a fluid reservoir containing the fire suppressant fluid under pressure, said dispensing valve apparatus comprising:

a valve body having a forward end adapted to mount to the pressure vessel, said valve body having a bore extending axially therethrough, said bore defining an axially extending central cavity having a forward cavity for receiving fluid from the fluid reservoir of the pressure vessel and a rearward cavity, said valve body having a generally radially extending discharge passage opening to the forward cavity;

a piston disposed within said cavity, said piston being axially translatable within the forward cavity and the rearward cavity from a first position wherein said discharge passage is closed to fluid flow and a second position wherein said discharge passage is open to fluid flow;

an actuator cap secured to said valve body at a rearward end of the rearward cavity, said actuator cap having a central bore establishing a fluid flow passage in fluid flow communication with the rearward cavity and extending through said actuator cap;

a check valve disposed within said central bore through said actuator cap, said check valve positionable between a first position wherein said central bore through said actuator cap is closed to fluid flow and a second position wherein said central bore through said actuator cap is open to fluid flow;

said valve body having a vent passage extending through said valve body, said vent passage being in fluid flow communication with said discharge passage, said vent passage being in fluid flow communication with said rearward cavity when said check valve is positioned in its second position;

a valve cap secured to a rearward end of said valve body, said valve cap defining a valve cap cavity; and an actuator disposed within the valve cap cavity, said actuator being selectively axially translatable toward said actuator cap for repositioning said actuator cap check valve from its first position to its second position.

3. A dispensing valve apparatus as recited in claim 2 wherein said vent passage is in fluid flow communication with the valve cap cavity.

4. A dispensing valve apparatus as recited in claim 1, wherein a section of the rearward cavity disposed between said piston in its first position and said actuator cap comprises a balance pressure chamber.

5. A dispensing valve apparatus as recited in claim 4, wherein said piston is held in its first position when a fluid pressure in the balance pressure chamber is equal to a fluid pressure within said forward cavity.

* * * * *